United States Patent
Balodis

(10) Patent No.: US 6,363,123 B1
(45) Date of Patent: Mar. 26, 2002

(54) RECEIVER CALIBRATION TECHNIQUE FOR GLOBAL ORBITING NAVIGATION SATELLITE SYSTEM (GLONASS)

(75) Inventor: Miroslaw Balodis, Garden Grove, CA (US)

(73) Assignee: Leica Geosystems Inc., Norcross, GA (US)

( * ) Notice: Subject to any disclaimer, the term of this patent is extended or adjusted under 35 U.S.C. 154(b) by 0 days.

(21) Appl. No.: 09/255,972

(22) Filed: Feb. 23, 1999

(51) Int. Cl.[7] .......................... H03K 9/00; H04L 27/06; H04L 27/14; H04L 27/22
(52) U.S. Cl. ................. 375/316; 342/357.06; 455/12.1; 701/207
(58) Field of Search ................................. 375/130, 136, 375/141, 147, 148, 220, 229, 260, 316, 340, 354, 356, 362; 329/327, 348, 363; 455/12.1, 13.2; 701/207; 342/357.06, 357.13

(56) References Cited

U.S. PATENT DOCUMENTS

| | | | | | |
|---|---|---|---|---|---|
| 5,311,194 A | * | 5/1994 | Brown | .................. | 342/357.06 |
| 5,526,291 A | * | 6/1996 | Lennen | ........................ | 702/85 |
| 5,630,208 A | * | 5/1997 | Enge et al. | .................... | 455/65 |
| 5,663,734 A | * | 9/1997 | Krasner | ................. | 342/357.12 |
| 5,831,574 A | * | 11/1998 | Krasner | ................. | 342/357.08 |
| 5,847,678 A | * | 12/1998 | Tachita | .................. | 342/357.03 |
| 5,884,214 A | * | 3/1999 | Krasner | ...................... | 701/207 |
| 5,914,685 A | * | 6/1999 | Kozlov et al. | ......... | 342/357.06 |
| 6,091,785 A | * | 7/2000 | Lennen | ........................ | 375/316 |
| 6,104,340 A | * | 8/2000 | Krasner | .................. | 342/357.1 |
| 6,133,871 A | * | 10/2000 | Krasner | ................. | 342/357.06 |

* cited by examiner

Primary Examiner—Stephen Chin
Assistant Examiner—Lenny Jiang
(74) Attorney, Agent, or Firm—Noel F. Heal

(57) ABSTRACT

A GLONASS receiver and a corresponding method for its calibration for more precise carrier phase measurements. The receiver includes a conventional receiver channel (36), having a bandpass filter (40) for establishing the sampling bandwidth prior to digitizing a plurality of received satellite signals, each having a different frequency. The receiver also includes a calibration channel (50) in which multiple satellite signals are bandbass filtered (in filter 58) at a single intermediate frequency, to avoid errors resulting from group delay variation introduced by passing multiple satellite signals through a common bandpass filter. The calibration channel (50) downconverts (56) to the intermediate frequency, bandpass filters (58), and then upconverts (60) again. Each satellite signal in turn is processed in this manner by selecting appropriate difference frequencies for downconversion and upconversion. The calibration channel (50) produces a set of reference carrier phase measurements that can be applied to correct errors in carrier phase measurements generated by the conventional receiver channels (36).

10 Claims, 6 Drawing Sheets

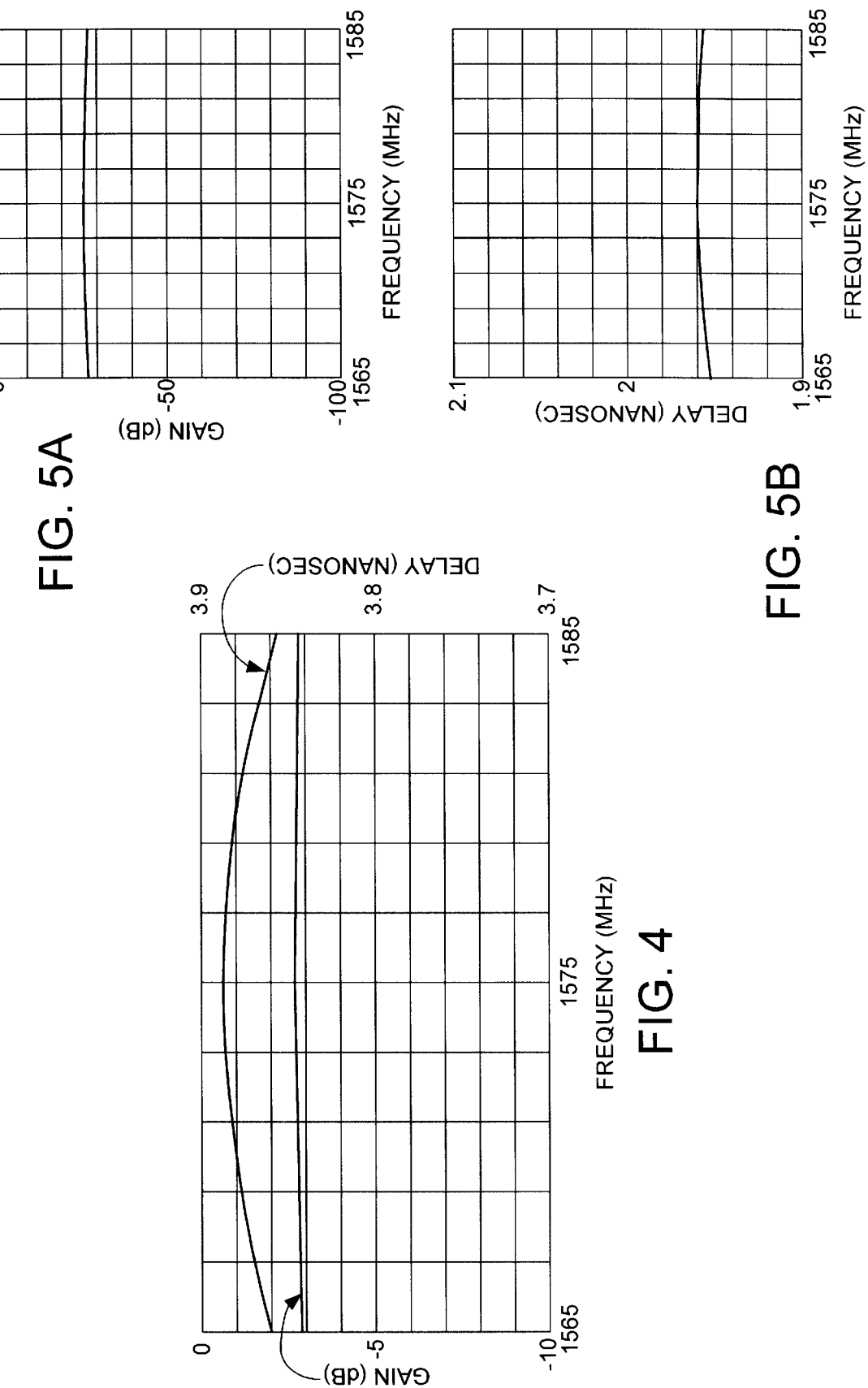

RECEIVER CALIBRATION TECHNIQUE FOR GLOBAL ORBITING NAVIGATION SATELLITE SYSTEM (GLONASS)

BACKGROUND OF THE INVENTION

This invention relates generally to Global Orbiting Navigation System ("GLONASS") signal receivers. More particularly, the present invention relates to a novel technique for calibrating GLONASS receivers for use in making survey measurements with sub-centimeter accuracy. GLONASS is a global navigation system developed in the former Soviet Union to perform the same functions as the Global Positioning System (GPS) developed in the United States. Receivers are being developed to process signals from both systems of satellites. Having more satellites available to a receiver results in a faster convergence on an accurate position result and, if visibility is limited by geographic or architectural obstructions, may provide for location determination that would not have been obtainable if only one set of satellites were used.

There are, however, design differences between GPS and GLONASS that have an impact on high accuracy applications. The present invention addresses a significant problem arising from one of these differences, as will be discussed below after first providing some background on GPS.

Overview of GPS:

The global positioning system (GPS) may be used for determining the position of a user with a GPS receiver located on or near the earth, from signals received from multiple orbiting satellites. The orbits of the GPS satellites are arranged in multiple planes, in order that the signals can be received from at least four GPS satellites at any selected point on or near the earth.

The nature of the signals transmitted from GPS satellites is well known from the literature, but will be described briefly by way of background. Each satellite transmits two spread-spectrum signals in the L band, known as L1 and L2, with separate carrier frequencies. Two signals are needed if it is desired to eliminate an error that arises due to the refraction of the transmitted signals by the ionosphere. Each of the carrier signals is modulated in the satellite by at least one of two pseudorandom noise (PRN) codes unique to the satellite, and transmitted as a spread spectrum signal. This allows the L-band signals from a number of satellites to be individually identified and separated in a receiver. Each carrier is also modulated by a slower-varying data signal defining the satellite orbits and other system information. One of the PRN codes is referred to as the C/A (clear/acquisition) code, while the second is known as the P (precise) code.

In the GPS receiver, signals corresponding to the known P code and C/A code may be generated in the same manner as in the satellite. The L1 and L2 signals from a given satellite are demodulated by aligning the phases, i.e., by adjusting the timing, of the locally-generated codes with those modulated onto the signals from that satellite. In order to achieve such phase alignment the locally generated code replicas are correlated with the received signals until the resultant output signal power is maximized. Since the time at which each particular bit of the pseudorandom sequence is transmitted from the satellite is known, the time of receipt of a particular bit can be used as a measure of the transit time or range to the satellite. Because the C/A and P codes are unique to each satellite, a specific satellite may be identified based on the results of the correlations between the received signals and the locally-generated C/A and P code replicas.

Each receiver "channel" within the GPS receiver is used to track the received signal from a particular satellite. A synchronization circuit of each channel provides locally generated code and carrier replicas, which are synchronous with each other. During acquisition of the code phase within a particular channel, the received satellite signal is correlated with a discrimination pattern comprised of some combination of "early" and "late" versions of the channel's locally generated code replica. The resultant early-minus-late correlation signals are accumulated and processed to provide feedback signals to control code and carrier synchronization.

Although there are several ways to create a spread spectrum signal, the one most often used is "direct spreading" with a pseudorandom code, which is the technique used in GPS. A direct sequence spread spectrum signal is normally created by biphase modulating a narrowband signal with a pseudorandom code. Each GPS satellite normally transmits three spread spectrum navigation signals. One is on the L2 carrier signal and is based on the P code from a P code generator, and two are on the L1 carrier signal and are based on the P code from the P code generator and the C/A code from a C/A code generator, respectively. To accomplish this, the L1 carrier signal is first divided into two components that are in phase quadrature. Each of these components is individually modulated with navigation signals before being combined, amplified, and transmitted.

The frequency spectrum resulting from this process is one in which the original carrier frequency at $F_0$ is suppressed, and the total signal energy is spread over a bandwidth around $F_0$ of plus and minus the code clock frequency to first nulls. Spectral components outside this bandwidth also are created, but at ever lower amplitude with frequency separation.

The key functions of each satellite are all driven by a single clock with a frequency of 10.23 MHz. The L1 carrier frequency of 1575.42 MHz is obtained by multiplying 10.23 MHz by 154. The L2 carrier frequency of 1227.6 MHz is 120 times the clock. The P code rate is 10.23 MHz and is obtained directly from the clock. The C/A code rate is one tenth the clock frequency and is obtained through a frequency divider. Even a 50 bit per second data rate used to retrieve data from a memory is derived from the same clock. It can be said that all of these signals are coherent because they are derived from a single clock.

In a typical GPS receiver, a single antenna collects all available signals, which are processed through a filter, an amplifier and a downconverter to obtain a lower intermediate frequency (IF) for further processing. Only then is the composite signal digitally sampled, to facilitate further processing of the signals in digital form.

A key aspect of the GPS design is that each satellite uses the same L1 and L2 carrier frequencies but pseudorandom code sequences (P-code and C/A-code sequences) that are unique to the satellite. In other words, the satellites are identified in a receiver by their unique pseudorandom code sequences.

The GLONASS Approach, and the Problem:

Each satellite in GLONASS uses the same pseudorandom code sequences but uses unique L1 and L2 frequencies. Thus, a GLONASS receiver identifies satellites by their carrier frequencies and not by their pseudorandom code sequences. Specifically, each satellite in GLONASS transmits on a frequency in the bands 1,597–1,617 MHz for L1 and 1,240–1,260 MHz for L2. The channel center frequency spacing is fixed at 0.5625 MHz for L1 and 0.4375 MHz for L2.

As originally conceived, both systems were designed to compute receiver locations for navigation purposes, based on measurements made of the arrival times of the pseudorandom code sequences from each satellite in view of the receiver. It was later found that receiver locations could be determined much more accurately by using measurements of the carrier phase. Receivers using carrier phase for location determination form a distinct and increasingly important class of positioning receivers referred to as kinematic processing receivers or survey receivers. These highly accurate receivers find application in survey work, in aircraft landing systems and in earth moving or landscaping machines.

A difficulty arises in processing GLONASS carrier frequency signals simply because they are different for different satellites. Each received carrier signal can be identified and isolated either with a separate, narrow bandpass filter for each satellite channel, or accounted for in digital data processing. In the preferred embodiment the satellite frequencies are selected and separation between channels is achieved in digital data processing. Prior to digitizing, a bandpass filter is used, encompassing all satellite frequencies and establishing the sampling bandwidth for an analog-to-digital (AID) converter. The group delay within the bandpass of this filter will introduce large, unknown delays between satellite channels, which will greatly deteriorate the receiver position measurement accuracy. A similar situation would arise if an individual narrowband filter were used for each satellite channel. It is virtually impossible to design a narrowband filter that introduces the same delay over a range of frequencies. Therefore, the carrier signal from any two GLONASS satellites will be subject to two different phase delays in the bandpass filter used to process the signals in a receiver. Kinematic processing, however, inherently requires the carrier signals received from the satellites to be referenced or compared. In simple terms, the arrival times of the carrier signals from two satellites are compared in kinematic processing. Differences in the carrier frequencies can be accounted for, but differences in phase delay caused by narrow-band filtering cause a very significant problem. Comparison of one carrier signal with another from a different satellite is rendered highly inaccurate because each signal is subject to a different delay in filtering. GPS satellite signals do not have this problem because all the received GPS signals have the same frequency and are filtered in a common filter. Separation into different "channels" corresponding to different satellites is effected later in processing, when the pseudorandom codes are identified. Thus, any A phase distortion affects the signals from different GPS satellites equally.

A distance of one centimeter is equivalent to a signal propagation delay of approximately 30 picoseconds at the carrier frequencies used in GLONASS and GPS. Thus, for one-centimeter accuracy, either the time delay variation between GLONASS channels must be smaller than 30 picoseconds (seconds$\times 10^{-12}$), or there must be some provision to calibrate the channels to that accuracy. With currently available receiver bandpass filters, group delay variations approaching 30 picoseconds throughout the passband cannot be achieved. Typical low-cost ceramic filters exhibit a delay variation of 5–10 nanoseconds (seconds$\times 10^{-9}$). Even the best surface acoustic wave (SAW) filters have at least 400 picoseconds average group delay in the passband, in addition to a delay ripple of much larger amplitude.

The principal group delay variation sources in radio frequency receivers are detection bandwidth determining elements, i.e., the RF (radio frequency) and IF (intermediate frequency) bandpass filters. Group delay variations in the passbands of these filters are due to a combination of: (a) delay-versus-frequency nonlinearities inherent in filter design, (b) production tolerances and (c) sensitivity to temperature changes and aging of components. Conceivably, a GLONASS receiver could be designed, constructed and then calibrated in such a way as to measure the variations (a) and (b) and to compensate for them, because these variations could be expected to remain constant. Slowly changing variations due to temperature changes and aging present a more difficult problem.

It will be appreciated from the foregoing that there is a need for a solution to the difficulties inherent in using GLONASS receivers for position determination to sub-centimeter accuracy. In particular, there is a need for a GLONASS receiver in which carrier phase measurements are not affected by channel-to-channel differences in distortion introduced by bandpass filters, or by slow variations in distortion caused by temperature changes or aging of components. The present invention satisfies this need, as will become clear from the following summary.

SUMMARY OF THE INVENTION

The present invention resides in a technique for periodically calibrating each of multiple channels in a GLONASS receiver, to ensure that there are no differences in carrier phase delay from channel to channel. Briefly, and in general terms, the receiver of the invention comprises an antenna subsystem for receiving signals from a plurality of orbiting satellites; a receiver channel coupled to the antenna subsystem, designed to receive and process all signals from a plurality of orbiting satellites, wherein the entire spectrum of satellite signals is passed through a bandpass filter for further processing; and a calibration channel, including a single narrow bandpass filter centered at a selected intermediate frequency. The calibration channel also includes means for processing signals from each of the satellites in turn through the single filter, to provide for each channel a reference carrier phase measurement that is independent of effects arising from the use of multiple bandpass filters in the plurality of conventional receiver channels.

More specifically, the means for processing signals from each of the satellites in turn through the filter includes a first frequency mixer, for downconverting signals received from the antenna subsystem to the selected intermediate frequency; a second frequency mixer, for upconverting signals output by the narrow bandpass fitter, by the same frequency that the signals were downconverted in the first frequency mixer; a local signal generator providing to the first and second frequency mixers a signal at a frequency that is the difference between the carrier frequency of signals received from a selected satellite and the intermediate frequency; and means for applying satellite selection signals to the local signal generator, to effect selection of different satellite signals in turn for processing through the narrow bandpass filter. The receiver may further comprise means for storing the reference carrier phase measurements corresponding to each of multiple receiver channels; and means for computing the difference between a carrier phase measurement from each conventional receiver channel and the reference carrier phase measurement corresponding to the same channel, to obtain a calibrated carrier phase measurement for each channel.

The means for storing the reference carrier phase measurements includes a plurality of phase measurement storage cells; and a demultiplexer having an input derived from the calibration channel, multiple outputs coupled to the phase measurement storage cells, and a control signal input receiving the same satellite selection signals that are used to control the local signal generator.

Further, the calibration channel and the conventional receiver channel may each include an analog-to-digital converter. The carrier phase measurements and reference carrier phase measurements are converted to digital form, for demultiplexing, storing and further processing. Another feature is that the calibration channel further includes first and second wide passband filters to remove unwanted frequency images that are a necessary by-product of frequency mixing.

The invention may also be defined as a method for calibration of a global orbiting satellite system (GLONASS) receiver, comprising the steps of receiving signals from a plurality of orbiting satellites, each distinguished by use of a different carrier frequency band; separating the satellite signals in digital processing, each having a different frequency offset for each satellite; obtaining from the conventional receiver channel a set of carrier phase measurements that is subject to errors resulting from the bandpass filter group delay variation; processing the received signals in a calibration channel that has a single bandpass filter centered at a selected intermediate frequency; and generating in the calibration channel a set of carrier phase reference measurements that can be used to correct the carrier phase measurements from the conventional receiver channel. More specifically, the step of processing the received signals in the calibration channel includes downconverting the received signals by a difference frequency selected to position the frequency band of signals from a selected satellite over the intermediate frequency; bandpass filtering the downconverted signals; upconverting the signals after bandpass filtering, by the same selected difference frequency used in the downconverting step; and periodically selecting a different satellite by changing the selected difference frequency used in the downconverting and upconverting steps. Moreover, step of generating a set of carrier phase reference measurements includes tracking and measuring the carrier phase for each of the selected satellites, and storing the carrier phase measurements resulting from the foregoing processing steps.

Even more specifically, the step of generating a set of carrier phase reference signals further comprises receiving reference carrier phase measurements from the calibration receiver; and distributing the reference carrier phase measurements to separate storage units corresponding to the separate satellites. The method may also include the step of computing corrected carrier phase measurements by computing the difference between the carrier phase measurements obtained from the conventional receiver channels and the corresponding reference carrier phase measurements stored in the storage units.

It will be appreciated from the foregoing that the present invention represents a significant advance in the field of global positioning receivers, particularly receivers for use with GLONASS. Specifically, the invention provides a technique for calibrating a conventional GLONASS receiver to allow it to be used for position measurements at subcentimeter accuracy. Other aspects and advantages of the invention will become apparent from the following more detailed description, taken in conjunction with the accompanying drawings.

BRIEF DESCRIPTION OF THE DRAWINGS

FIG. 4 is a graph showing typical variations in gain and delay in a 100-MHz wide Bessel filter, over a 20-MHz wide passband;

FIGS. 5A and 5B are graphs showing typical variations in gain and delay, respectively, in a 200-MHz wide Bessel filter, over a 20-MHz passband;

DESCRIPTION OF THE PREFERRED EMBODIMENT

Figure 1:
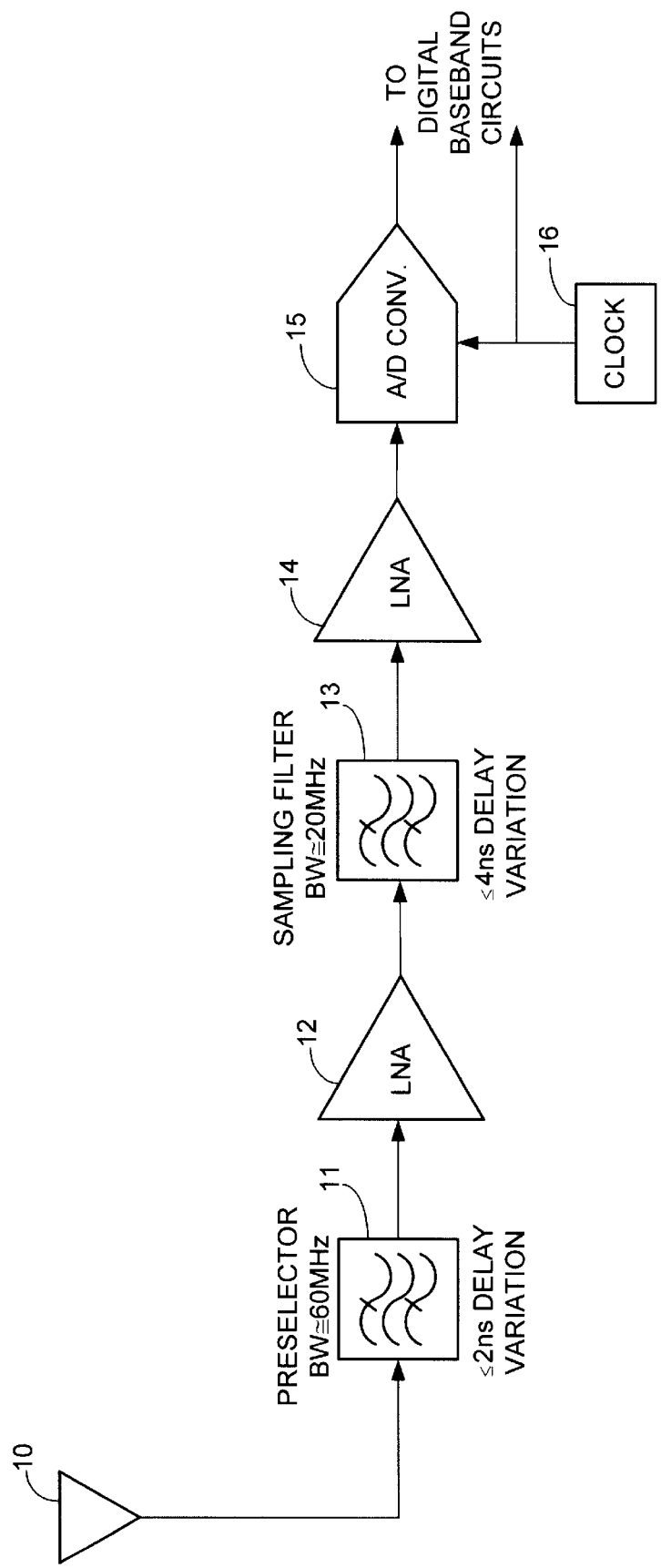
FIG. 1 is a simplified block diagram of portion of a GLONASS receiver.

As shown in the drawings for purposes of illustration, the present invention is concerned with improvements in Global Navigation Satellite System (GLONASS) receiver design. Because each GLONASS satellite uses different carrier frequencies to identify the satellites uniquely, a conventional GLONASS receiver is inherently subject to inaccuracy when processing carrier phase measurements. The reason for this inaccuracy is that the bandpass filter has different group delays for each satellite channel, resulting from frequency dependent nonlinearities, sensitivity to temperature changes and component aging. Global Positioning System (GPS) receivers are not subject to errors of this type because all GPS satellites use the same pair of carrier frequencies. Therefore, all of the received satellite signals can be processed in a receiver with a common bandpass filter, and are, therefore, subject to identical phase delays.

Figure 2:
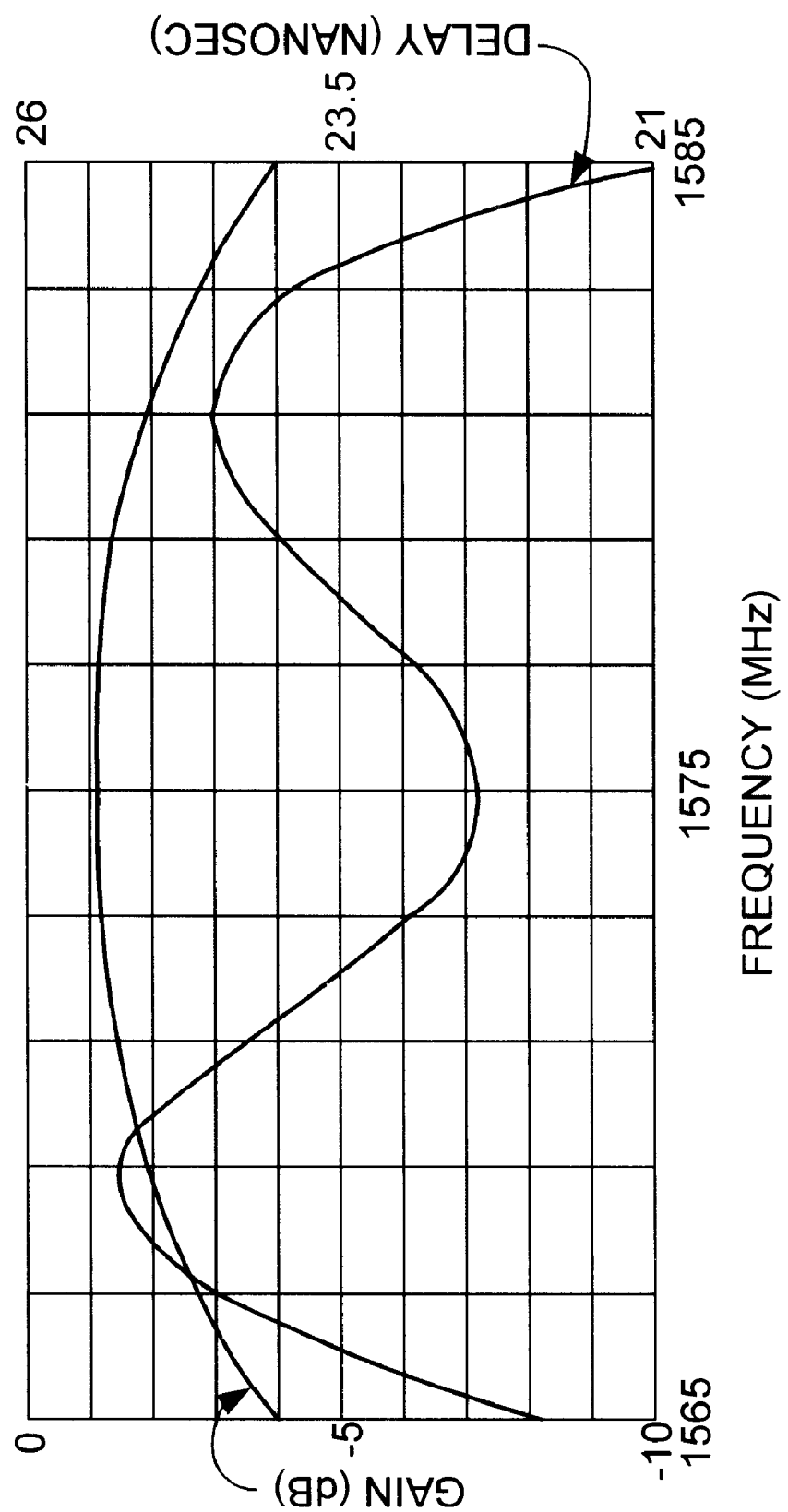
FIG. 2 is a graph showing typical variations in gain and delay in a sampling filter of FIG. 1, over a bandwidth of 20 MHz.

In accordance with the present invention, a GLONASS receiver is periodically and automatically calibrated to compensate for errors arising from the use of different carrier frequencies and different bandpass filters for each satellite channel. By way of background, FIG. 1 shows portions of a conventional GLONASS receiver, including an antenna, indicated by reference numeral 10, a preselector filter 11, a low-noise amplifier (LNA) 12, a sampling filter 13, another low-noise amplifier (LNA) 14, an analog-to-digital (A/D) converter 15 and a clock 16. The filters 11 and 13 are both bandpass filters, having bandwidths of 60 MHz and 20 MHz, respectively. The sampling filter 13, as shown in FIG. 2, introduces a delay that varies over a range of approximately 4 nanoseconds across the passband of the filter.

The foregoing estimate of accuracy is based on the use of a Butterworth filter configuration, which is readily available at low cost. Filters designed for minimum delay variation, such as Bessel filters, would reduce the delay error. However, delay variations smaller than 30 picoseconds would be beyond reach, given the budgetary constraints of commercial grade GLONASS receiver parts.

One solution to this problem is to make the preselector filters in receivers considerably wider, and therefore subject to lower group delay variation. Wider filters are, of course, subject to degraded interference rejection. FIG. 4 shows the characteristics of a 100 MHz wide Bessel filter. The passband delay variation of such a filter would not exceed 20 picoseconds. Combined with filters of similar design in antenna preamplifiers circuits, they would introduce less than a 30-picosecond delay variation across the 10-MHz P-code bandwidth in GLONASS.

Figure 3:
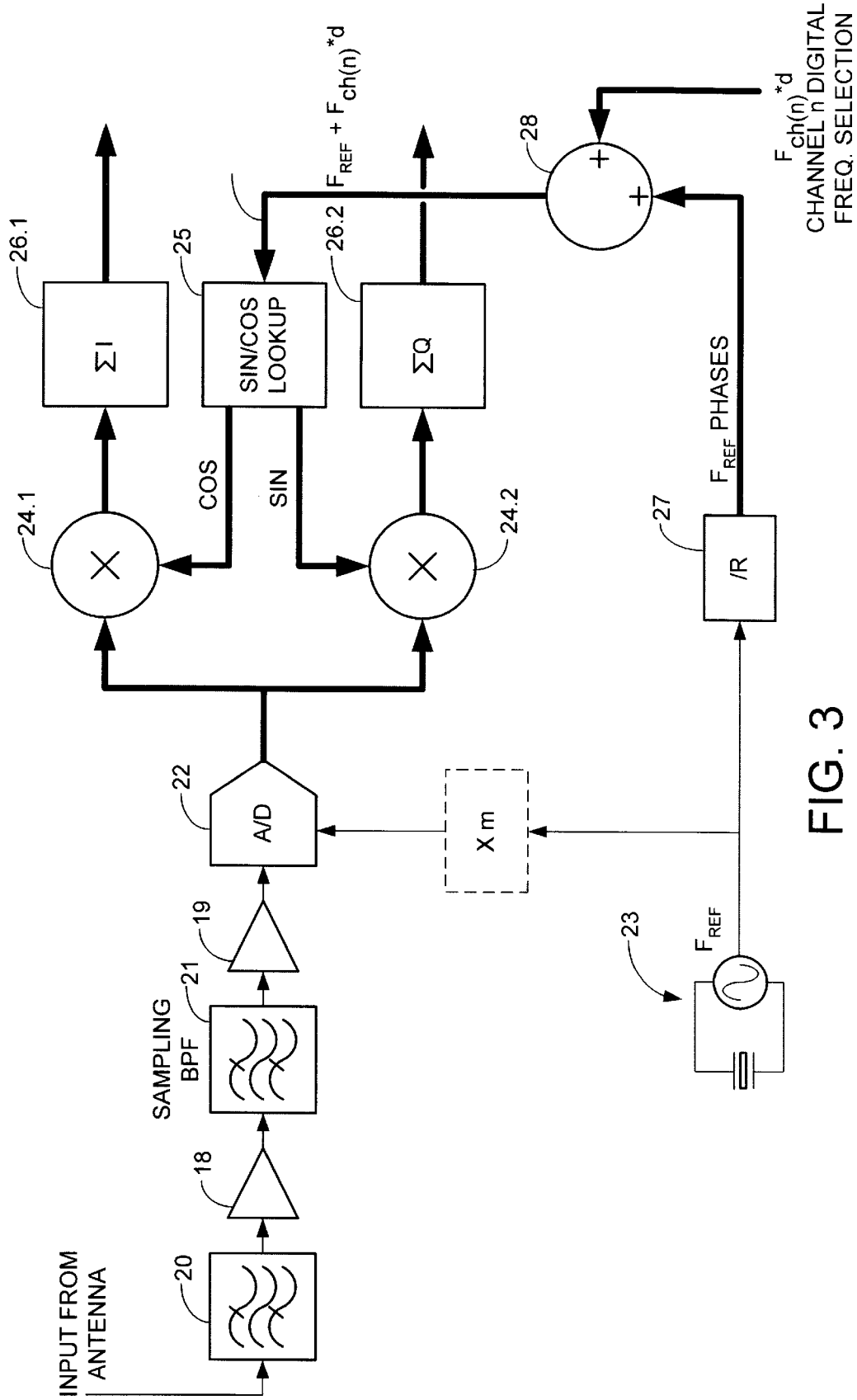
FIG. 3 is a block diagram of a GLONASS receiver in which channel selection is effected by digital processing rather than by using an individual bandpass filter for each channel.

FIG. 3 depicts a portion of a GLONASS receiver in which channel selection is effected digitally instead of using an individual filter for each channel. Input signals from an antenna are amplified and filtered in amplifiers 18 and 19 and bandpass filters 20 and 21. The amplified and filtered signals are input to a digital sampler in the form of a two-bit analog-to-digital converters 22. Although digital selection of GLONASS channels is the preferred approach, the bandpass filter 20 still introduces large unknown delays that vary from one channel to another.

In the digitally selected frequency receiver as shown, the A/D converter 22 is driven from a reference clock source 23, which generates a clock signal at a frequency $F_{REF}$, a harmonic of which is used as the sampling frequency. The next step shown in processing the digital signals is to generate in-phase (I) and quadrature (Q) components, using conventional digital processing. As shown in FIG. 3, the digital samples from the analog-to-digital converter 22 are input to two multipliers 24.1 and 24.2, where each sample is multiplied by cosine and sine values, respectively, for the phase angle corresponding to the digital sample, the cosine and sine values being obtained from a sin/cos lookup memory 25. Successive values of the sine and cosine products from the multipliers 24.1 and 24.2 are accumulated in an I summation circuit 26.1 and a Q summation circuit 26.2.

The sin/cos lookup memory 25 is driven by a stream of phase angles that is also derived in part from the reference clock 23. Clock processing circuitry 27 generates a stream of phase angle signals at frequency $F_{REF}$. The phase angle signals at frequency $F_{REF}$ are combined with a digital channel frequency selection signal in a frequency addition circuit 28. The resulting stream of phase angles is applied to the sin/cos lookup memory 25, to produce streams of cosine and sine signals in synchronism with the digital samples produced by the converter 22. The phase angles produced on line 29 from the frequency addition circuit 28 have an effective frequency that is the sum of the reference frequency and the frequency of a selected GLONASS channel, corrected for Doppler effect.

Figure 6:
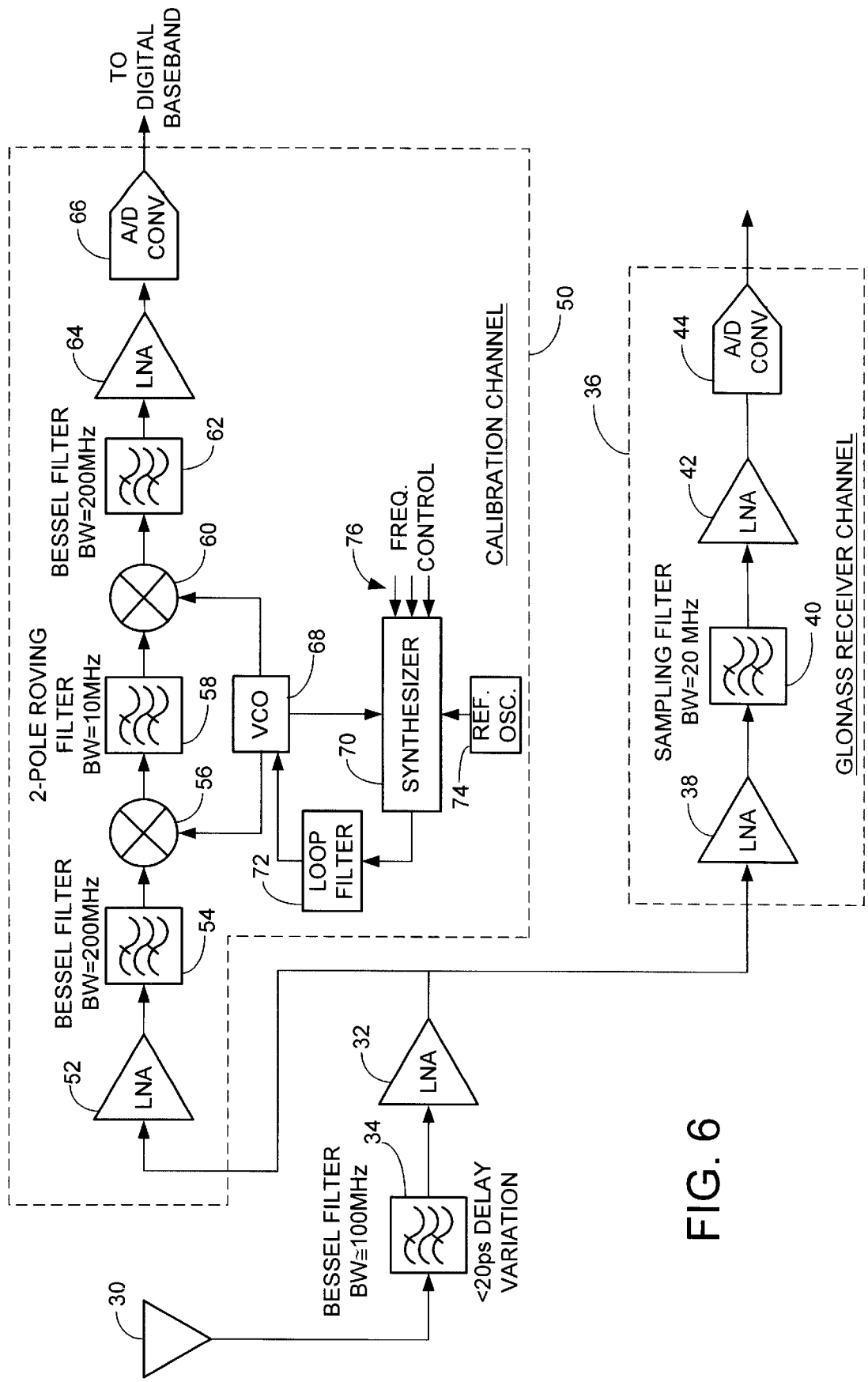
FIG. 6 is a block diagram of a GLONASS receiver modified in accordance with the present invention to compensate for phase delay variations in bandpass filters in the conventional receiver channels.

FIG. 6 illustrates the principle of the invention applied to a conventional GLONASS receiver. The receiver has an antenna 30 coupled to a low-noise amplifier 32 through a Bessel filter 34 having a 100 MHz bandwidth with characteristics similar to those shown in FIG. 4. The output of the low-noise amplifier 32 is coupled to a conventional GLONASS receiver, shown at 36. This channel includes a first low-noise amplifier 38, a sampling filter 40, a second low-noise amplifier 42 and an analog-to-digital converter 44, all connected in series. The sampling filter 40 has a bandwidth of approximately 20 MHz and is subject to group delay variations due to differences in frequencies processed, production tolerances and sensitivity to temperature changes and aging.

In accordance with the invention, the output of low-noise amplifier 32 is also coupled to a calibration channel 50, which computes phase or delay corrections for each of the channels, based on bandpass filtering each channel in turn at a common intermediate frequency. The calibration channel 50 includes a first low-noise amplifier 52, a first 200 MHz wide Bessel filter 54, a first frequency mixer 56, a narrow 10 MHz wide filter 58, a second frequency mixer 60, a second 200 MHz wide Bessel filter 62, a second low-noise amplifier 64 and an analog-to-digital converter 66. The first mixer 56 downconverts the incoming signal to selected intermediate frequency, at which the downconverted signal is bandpass filtered in the narrow filter 58, to select a particular channel. The resulting filtered signal is then upconverted by the second mixer 60, to its original L-band frequency, after which the signal is amplified in amplifier 64 and converted to digital form in the converter 66. Other important components of the calibration channel 50 include a voltage controlled oscillator (VCO) 68, which generates signals of an appropriate frequency to supply to the first and second mixers 56 and 60, such that the incoming signal is downshifted by an amount selected to place a selected receiver channel frequency at the center of the passband of the 10 MHz filter 58. Since each receiver channel uses different frequency bands, each must be down-shifted by a Δ different amount to place it in overlapping relationship with the filter 58. For this purpose, the VCO 68 is controlled by signals supplied from a feedback loop including a synthesizer 70, loop filter 72, and reference oscillator 74. Basically, the synthesizer 70 generates a signal of appropriate frequency from the reference oscillator signals and frequency dividers controlled by frequency control signals, as indicated on lines 76. The frequency control signals 76 control the synthesizer to generate a different frequency for each receiver channel. Internally, the synthesizer 70 compares these generated signals with the output of the VCO, on line 78, and generates appropriate VCO control signals on line 80, and these control signals are filtered by the loop filter 72. Other forms of control circuitry may be used to supply different selected frequencies to the mixers 56 and 60 for the different receiver channels.

Figure 7:
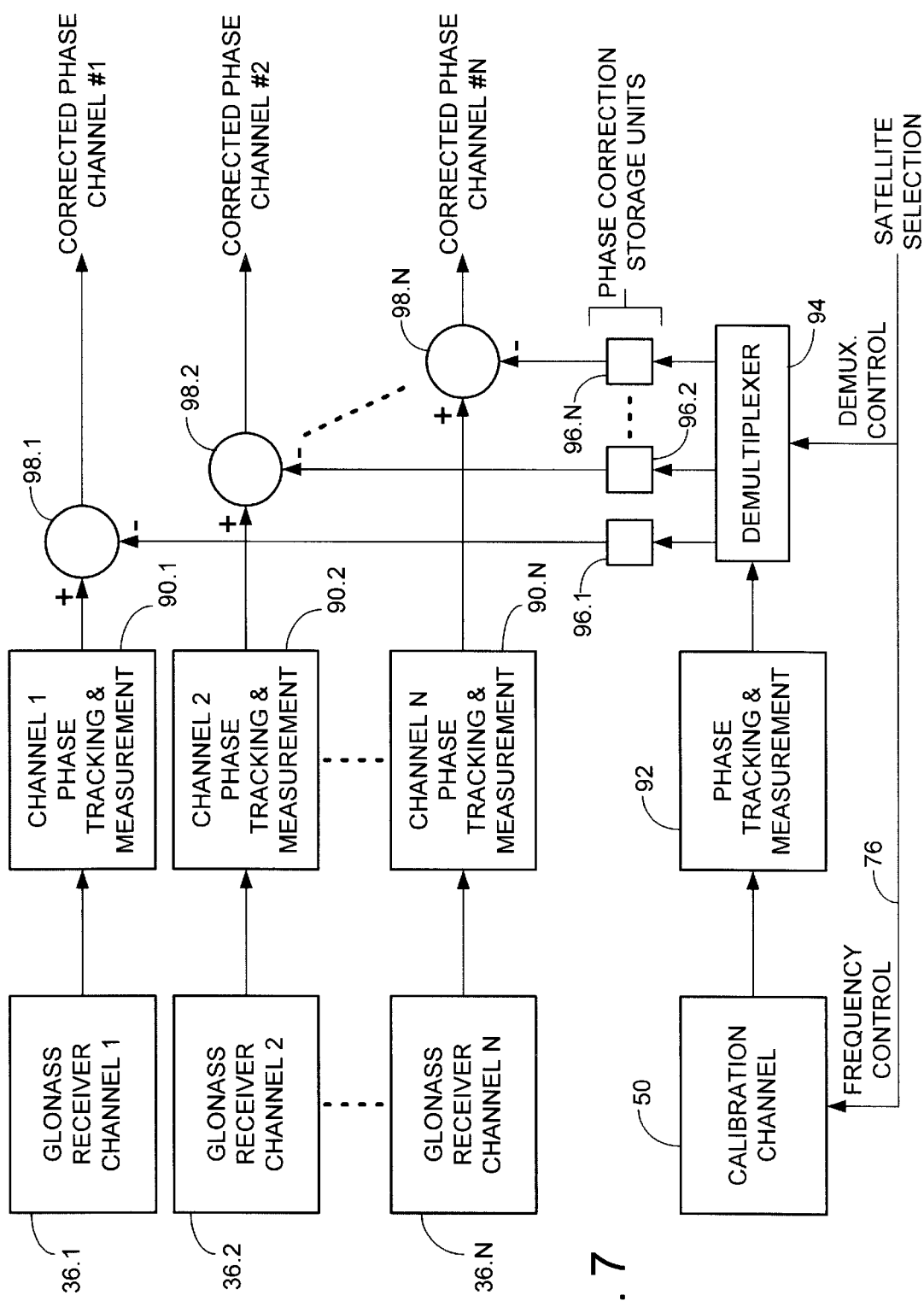
FIG. 7 is another block diagram showing how reference carrier phase measurements are stored and applied to correct carrier phase measurements obtained from conventional GLONASS receiver channels after satellite signal selection in digital processing.

How the output signals from the calibration channel 50 are used to calibrate each of the GLONASS channels 36 is best understood from FIG. 7. The digital output of each of the GLONASS channels, indicated at 36.1 through 36.N, is processed in separate digital phase tracking and measurement circuits, indicated at 90.1 through 90.N. Similarly, the calibration channel 50 has a phase tracking and measurement circuit 92. A product of each of these phase tracking and measurement circuits is a carrier phase measurement, which is used with the other phase measurements to calculate the location of the receiver. As discussed above, however, the phase measurements derived in the conventional GLONASS channels are subject to errors due to the frequency differences among the channels, as well as errors due to differences between channel group delays introduced by bandpass filter group delay variations, and differences due to temperature changes and aging of the filter components. The present invention provides for bandpass filtering of each channel using a single bandpass filter centered at a common intermediate frequency. Therefore, for each channel in turn, the calibration channel 50 provides phase measurements that are not subject to these channel-to-channel differences. Utilization of these calibration measurements requires just a few additional components, including a demultiplexer 94, phase correction storage means 96 for each GLONASS channel, and a signal subtractor circuit 98 for each channel.

Satellite channel selection signals are applied to line 76, which effects frequency control of the calibration channel 50, as discussed with reference to FIG. 6, and simultaneously controls the demultiplexer 94. Phase measurements from the calibration channel phase tracking and measurement circuit 92 are directed by the demulitplexer 94 to an appropriate phase correction storage element 96. When channel #1 is being calibrated, for example, the phase measurement from the circuit 92 is directed to phase correction storage unit 96.1. The satellite selection signals select each channel in turn on a periodic basis, such as every few seconds or every few minutes. Thus the phase correction storage units 96 contain the most recent phase calibration corrections for each of the receiver channels. Phase measurements generated by the phase tracking and measurement circuits 90 are automatically adjusted in the signal subtractors 98, to produce corrected phase signals for each of the receiver channels.

The sampling filters 40 in the GLONASS channels 36 and the roving filter 58 in the calibration channel 50 are preferably constructed of ceramic material, which has a low temperature coefficient. The variation of filter delay characteristics as a function of temperature can be expected to be relatively small. Also, ambient temperature variation is relatively slow because the circuitry is housed in an insulated enclosure that interposes long thermal time constants. Therefore, calibration can proceed at a relatively slow pace without loss of accuracy in any of the channels.

It will be appreciated from the foregoing that the present invention represents a significant advance in the field of GLONASS receiver design for precision location measurements. In particular, the invention permits the use of GLONASS satellites for highly accurate survey and other applications. Receivers using a combination of GLONASS and GPS satellites provide for faster determination of location measurements, or, in some environmental conditions, may mean the difference between obtaining a solution or not doing so, simply because of the larger number of satellites that GLONASS provides when used in combination with GPS. It will also be appreciated that, although a specific embodiment of the invention has been disclosed by way of illustration, various modifications may be made without departing from the spirit and scope of the invention. Accordingly, the invention should not be limited except as by the appended claims.

What is claimed is:

1. A global orbiting satellite system (GLONASS) receiver, comprising:

an antenna subsystem for receiving signals from a plurality of orbiting satellites;

a conventional receiver channel coupled to the antenna subsystem, the receiver channel being designed to receive, filter and digitally select the frequencies of signals from the plurality of orbiting satellites, wherein the satellites are distinguished by the use of different carrier frequencies and the receiver channel includes a bandpass filter; and a calibration channel, including a single narrow bandpass filter centered at a selected intermediate frequency, and means for processing signals from each of the satellites in turn through the single filter, to provide for each channel a reference carrier phase measurement that is independent of effects arising from group delay variation introduced by the bandpass filter in the receiver channel.

2. A global orbiting satellite system (GLONASS) receiver as defined in claim 1, wherein the means for processing signals from each of the satellites in turn through the filter includes:

a first frequency mixer, for downconverting signals received from the antenna subsystem to the selected intermediate frequency;

a second frequency mixer, for upconverting signals output by the narrow bandpass filter, by the same frequency that the signals were downconverted in the first frequency mixer;

a local signal generator providing to the first and second frequency mixers a signal at a frequency that is the difference between the carrier frequency of signals received from a selected satellite and the intermediate frequency; and means for applying satellite selection signals to the local signal generator, to effect selection of different satellite signals in turn for processing through the narrow bandpass filter.

3. A global orbiting satellite system (GLONASS) receiver as defined in claim 2, and further comprising:

means for storing the reference carrier phase measurements corresponding to each of multiple receiver channels; and means for computing the difference between a carrier phase measurement from each conventional receiver channel and the reference carrier phase measurement corresponding to the same channel, to obtain a calibrated carrier phase measurement for each channel.

4. A global orbiting satellite system (GLONASS) receiver as defined in claim 3, wherein the means for storing the reference carrier phase measurements includes:

a plurality of phase measurement storage cells; and a demultiplexer having an input derived from the calibration channel, multiple outputs coupled to the phase measurement storage cells, and a control signal input receiving satellite selection signals to effect switching of the demultiplexer to successive phase measurement storage cells.

5. A global orbiting satellite system (GLONASS) receiver as defined in claim 4, wherein:

the calibration channel and the conventional receiver channel each include an analog-to-digital converter; and the carrier phase measurements and reference carrier phase measurements are converted to digital form for demultiplexing and storing.

6. A global orbiting satellite system (GLONASS) receiver as defined in claim 2, wherein the calibration channel further includes:

first and second wide passband filters to remove unwanted frequency images that are a necessary by-product of frequency mixing.

7. A method for calibration of a global orbiting satellite system (GLONASS) receiver, comprising the steps of:

receiving signals from a plurality of orbiting satellites, each distinguished by use of a different carrier frequency band;

bandpass filtering the plurality of orbiting satellite signals using a bandpass filter in each of a plurality of conventional receiver channels;

digitizing the filtered signal spectrum;

obtaining from the digitized filtered satellite channel signals a set of carrier phase measurements that is subject to errors resulting from the use of different passband filters in the receiver channels;

processing the received signals in a calibration channel that has a single bandpass filter centered at a selected intermediate frequency; and generating in the calibration channel a set of carrier phase reference measurements that can be used to correct the carrier phase measurements from the conventional receiver channels.

8. A method as defined in claim 7, wherein the step of processing the received signals in the calibration channel includes:

downconverting the received signals by a difference frequency selected to position the frequency band of signals from a selected satellite over the intermediate frequency;

bandpass filtering the downconverted signals;

upconverting the signals after bandpass filtering, by the same selected difference frequency used in the downconverting step; and periodically selecting a different satellite by changing the selected difference frequency used in the downconverting and upconverting steps;

and wherein the step of generating a set of carrier phase reference measurements includes tracking and measuring the carrier phase for each of the selected satellites, and storing the carrier phase measurements resulting from the foregoing processing steps.

9. A method as defined in claim 8, wherein the step of generating a set of carrier phase reference measurements further comprises:

receiving reference carrier phase measurements from the calibration channel; and distributing the reference carrier phase measurements to separate storage units corresponding to the separate satellites.

10. A method as defined in claim 9, and further comprising:

computing corrected carrier phase measurements by computing the difference between the carrier phase measurements obtained from the conventional receiver channels and the corresponding reference carrier phase measurements stored in the storage units.

* * * * *